US010690584B2

(12) United States Patent
Burriel et al.

(10) Patent No.: US 10,690,584 B2
(45) Date of Patent: Jun. 23, 2020

(54) AIR PARTICULATE DETECTION SYSTEM

(71) Applicant: CARRIER CORPORATION, Palm Beach Gardens, FL (US)

(72) Inventors: Ricard Burriel, Barcelona (ES); Joan Fuster, Barcelona (ES); Michael J. Birnkrant, Wethersfield, CT (US); Jose Manuel Munuera, Barcelona (ES)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 16/185,225

(22) Filed: Nov. 9, 2018

(65) Prior Publication Data

US 2019/0145883 A1    May 16, 2019

(30) Foreign Application Priority Data

Nov. 13, 2017 (EP) ..................................... 17382763

(51) Int. Cl.
| | | |
|---|---|---|
| *G01N 15/14* | (2006.01) | |
| *G01N 15/06* | (2006.01) | |
| *G01N 1/26* | (2006.01) | |
| *G01N 1/22* | (2006.01) | |

(52) U.S. Cl.
CPC ....... *G01N 15/1436* (2013.01); *G01N 1/2273* (2013.01); *G01N 1/26* (2013.01); *G01N 15/06* (2013.01); *G01N 15/1404* (2013.01); *G01N 2015/0693* (2013.01)

(58) Field of Classification Search
CPC .... G01N 15/1436; G01N 1/2273; G01N 1/26; G01N 15/06; G01N 15/1404; G01N 2015/0693

USPC ....................... 250/435, 493.1, 494.1, 504 R
See application file for complete search history.

(56) References Cited

U.S. PATENT DOCUMENTS

| | | |
|---|---|---|
| 6,184,537 B1 | 2/2001 | Knox et al. |
| 6,985,081 B2 | 1/2006 | Wagner et al. |
| 7,062,953 B2 | 6/2006 | Yamano et al. |
| 7,242,009 B1 | 7/2007 | Wilson et al. |
| 7,508,313 B2 | 3/2009 | Cole |
| 7,834,773 B2 | 11/2010 | Kato |

(Continued)

FOREIGN PATENT DOCUMENTS

| | | |
|---|---|---|
| CN | 201716810 U | 1/2011 |
| CN | 101727727 B | 6/2011 |

(Continued)

OTHER PUBLICATIONS

Extended European Search Report for Application No. 17382763.5; Report dated May 3, 2018; 1-9 pages.

*Primary Examiner* — Nicole M Ippolito
(74) *Attorney, Agent, or Firm* — Cantor Colburn LLP

(57) ABSTRACT

An air particulate detection system is provided. The air particulate detection system comprising: an aspiration particulate detection system; one or more pipe runs fluidly connected to the aspiration detection system, wherein each of the one or more pipe runs includes one or more sampling points configured to allow an air particulate entry into at least one of the one or more pipe runs; and a secondary particulate detector fluidly connected to the aspiration particulate detection system through the one or more pipe runs, wherein the secondary particulate detector is in communication with the aspiration particulate detection system.

20 Claims, 4 Drawing Sheets

(56) References Cited

U.S. PATENT DOCUMENTS

| | | |
|---|---|---|
| 8,743,366 B2 | 6/2014 | Numao et al. |
| 9,574,996 B2 | 2/2017 | Masumoto et al. |
| 9,741,240 B2 | 8/2017 | Holcombe |
| 2015/0022363 A1 | 1/2015 | Lang et al. |
| 2017/0162019 A1 | 6/2017 | Cruse et al. |
| 2017/0212030 A1 | 7/2017 | Hasegawa et al. |
| 2019/0005805 A1* | 1/2019 | Griffith .................. G08B 29/24 |

FOREIGN PATENT DOCUMENTS

| | | |
|---|---|---|
| CN | 203250387 U | 10/2013 |
| CN | 203870754 U | 10/2014 |
| CN | 103280057 B | 8/2016 |
| CN | 206451328 | 8/2017 |
| WO | 9846978 A1 | 10/1998 |

\* cited by examiner

AIR PARTICULATE DETECTION SYSTEM

CROSS-REFERENCE TO RELATED APPLICATIONS

This application claims the benefit of European Patent Application No. 17382763.5 filed Nov. 13, 2017, which is incorporated herein by reference in its entirety.

BACKGROUND

The subject matter disclosed herein generally relates to the field of air particulate detection, and more specifically, an apparatus and method for air particulate detection systems utilizing aspiration.

Aspiration smoke detection systems provide early alarm on smoke generation in the protected areas. Aspiration smoke detection systems sample air from a detection area and transport the air through a pipe run to a laser in a detection chamber. Since the pipe run has many sampling points, it is typically unknown where the smoke has been physically generated. Further, the length of the pipe run affects the time of detection because it takes time to transport the particles from the sampling point to the detector chamber.

BRIEF SUMMARY

According to one embodiment, an air particulate detection system is provided. The air particulate detection system comprising: an aspiration particulate detection system; one or more pipe runs fluidly connected to the aspiration detection system, wherein each of the one or more pipe runs includes one or more sampling points configured to allow an air particulate entry into at least one of the one or more pipe runs; and a secondary particulate detector fluidly connected to the aspiration particulate detection system through the one or more pipe runs, wherein the secondary particulate detector is in communication with the aspiration particulate detection system.

In addition to one or more of the features described above, or as an alternative, further embodiments may include that the aspiration particulate detection system further comprises a blower to transport the air particulate from each of the one or more sampling points through the one or more pipe runs to the aspiration particulate detection system.

In addition to one or more of the features described above, or as an alternative, further embodiments may include that the air is transported through the secondary particulate detector by the blower.

In addition to one or more of the features described above, or as an alternative, further embodiments may include that the secondary particulate detector further comprises: a laser source configured to generate a laser having a plurality of wavelengths; and a sensor configured to detect at least one of an amount of laser scatter and laser fluorescence in response to interaction of the laser and air particulates.

In addition to one or more of the features described above, or as an alternative, further embodiments may include that the secondary particulate detector is configured to transmit at least one of the amount of light scatter and the laser fluorescence to the aspiration particulate detection system.

In addition to one or more of the features described above, or as an alternative, further embodiments may include that the secondary particulate detector is configured to determine an identity of the air particulate in response to at least one of the amount of light scatter and the laser fluorescence.

In addition to one or more of the features described above, or as an alternative, further embodiments may include that the secondary particulate detector is configured to transmit the identity of the air particulate to the aspiration particulate detection system.

In addition to one or more of the features described above, or as an alternative, further embodiments may include that the aspiration particulate detection system is configured to activate an alarm in response to the identity of the air particulate.

In addition to one or more of the features described above, or as an alternative, further embodiments may include that the secondary particulate detector further comprises: an infrared light source configured to generate an infrared light; and a sensor configured to detect an infrared signature of an air particulate in response to interaction of the infrared light and the air particulate.

In addition to one or more of the features described above, or as an alternative, further embodiments may include that the secondary particulate detector is configured to transmit the infrared signature to the aspiration particulate detection system.

In addition to one or more of the features described above, or as an alternative, further embodiments may include that the secondary particulate detector is configured to determine an identity of the air particulate in response to the infrared signature.

In addition to one or more of the features described above, or as an alternative, further embodiments may include that the secondary particulate detector is configured to transmit the identity of the air particulate to the aspiration particulate detection system.

In addition to one or more of the features described above, or as an alternative, further embodiments may include that the aspiration particulate detection system is configured to activate an alarm in response to the identity of the air particulate.

In addition to one or more of the features described above, or as an alternative, further embodiments may include that the secondary particulate detector is located in a first detection area and the aspiration particulate detection system is located in a second detection area separate from the first detection area.

In addition to one or more of the features described above, or as an alternative, further embodiments may include that the secondary particulate detector is located proximate at least one of the one or more sampling points.

According to another embodiment, method of detecting air particulates is provided. The method comprising: allowing air particulate entry into one or more pipe runs through one or more sampling points, wherein each of the one or more pipe runs initiate at a first end and terminate at a second end; conveying the air particulate through the one or more pipe runs using an aspiration particulate detection system fluidly connected each of the one or more pipe runs at the second end; and determining an identity of the air particulate using a secondary particulate detector fluidly connected to the aspiration particulate detection system through the one or more pipe runs.

In addition to one or more of the features described above, or as an alternative, further embodiments may include: transmitting the identity of the air particulate from the secondary particulate detector to the aspiration particulate detection system.

In addition to one or more of the features described above, or as an alternative, further embodiments may include:

determining at least one of a location of the air particulate and an air particulate concentration.

In addition to one or more of the features described above, or as an alternative, further embodiments may include: displaying at least one of the air particulate concentration, the location of the air particulate, and the identity of the air particulate.

In addition to one or more of the features described above, or as an alternative, further embodiments may include: activating an alarm in response to at least one of the air particulate concentration, the location of the air particulate, and the identity of the air particulate.

Technical effects of embodiments of the present disclosure include incorporating separate detectors into pipe runs of aspiration smoke detection systems.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

DETAILED DESCRIPTION

A detailed description of one or more embodiments of the disclosed apparatus and method are presented herein by way of exemplification and not limitation with reference to the Figures.

An event inside the environment of an area, building, room or part of a room can lead to unsafe conditions. The events of interest generate air particulates that are combustion materials, biomolecules, oil mist, or metallic powders. Detection of the presence of air particulates from the environmental background is achieved using optical scattering. The reduction in transmitted light and increase in scattered light is utilized to detect these events.

Figure 1:
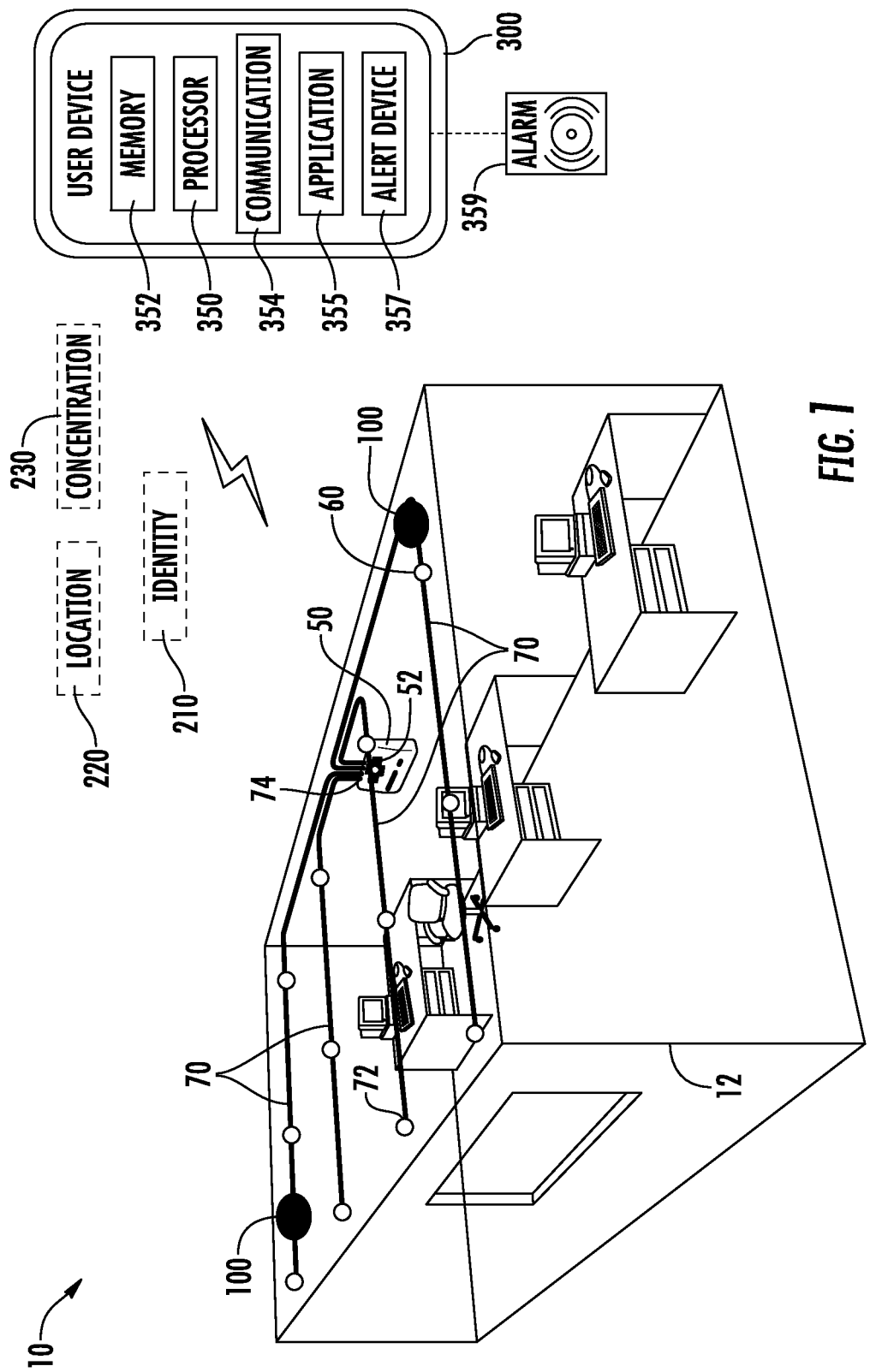
FIG. 1 is a schematic illustration of an air particulate detection system, in accordance with an embodiment of the disclosure.

Referring now to FIG. 1, FIG. 1 shows a schematic illustration of an air particulate detection system 10, according to an embodiment of the present disclosure. The air particulate detection system 10 may comprise an aspiration particulate detection system 50, one or more pipe runs 70 fluidly connected to the aspiration detection system 50, and a secondary particulate detector 100 fluidly connected to the aspiration particulate detection system 50 through the one or more pipe runs 70. Each of the one or more pipe runs 70 initiate at a first end 72 and terminates at a second end 74. The aspiration detection system 50 is fluidly connected to each of the one or more pipe runs 70 at the second ends 74. Each of the one or more pipe runs 70 includes one or more sampling points 60 configured to allow air particulates entry into at least one of the one or more pipe runs. The sampling points 60 may be an orifice and/or a nozzle in two non-limiting embodiments.

The aspiration particulate detection system 50 further comprises a blower 52 to transport air particulates from each of the one or more sampling points 60 through the one or more pipe runs 70 to the aspiration particulate detection system 50. The blower 52 also transports the air particulates through each of the secondary particulate detectors 74. The secondary particulate detector 100 may be located proximate the first end of one of the pipe runs 70 or the secondary particulate detector 100 may be located in the middle of the pipe run 70. In an embodiment, the secondary particulate detector 100 is located proximate to at least one of the one or more sampling points 60. Advantageously, locating the secondary particulate detector 100 proximate to a sampling point 60 reduces detection time by removing transport time. Air particulate identification occurs close to the sample point 60 rather than waiting for the air particulate to travel from the sampling point 60 through the pipe run 70 to the aspiration particulate detection system 50. Also advantageously, locating the secondary particulate detector 100 proximate to a sampling point 60 allows for identification of a location 220 of the air particulate. For example, a secondary particulate detector 100 may be located in each detection area 12 of a building and the detection area 12 where smoke arises may be identified by which secondary particulate detector 100 detects smoke.

The secondary particulate detector 100 is in wireless electronic communication with the aspiration particulate detection system 50 and may be powered by an independent power source (not shown). In a non-limiting example, the independent power source may be a battery. In the example of FIG. 1, the secondary particulate detector 100 is located in the same detection area 12 as the aspiration particulate detection system 50 but each may be located in different detection area 12. For example, the secondary particulate detector 100 may be located in a first detection area and the aspiration particulate detection system 50 may be located in a second detection area separate from the first detection area. Advantageously, by locating the aspiration particulate detection system 50 in a second detection area different from the first detection area, noise from the blower 52 may be reduced in the first detection area while maintaining quick particulate identification capability by the secondary particulate detector 100 in the first detection area.

Figure 2:
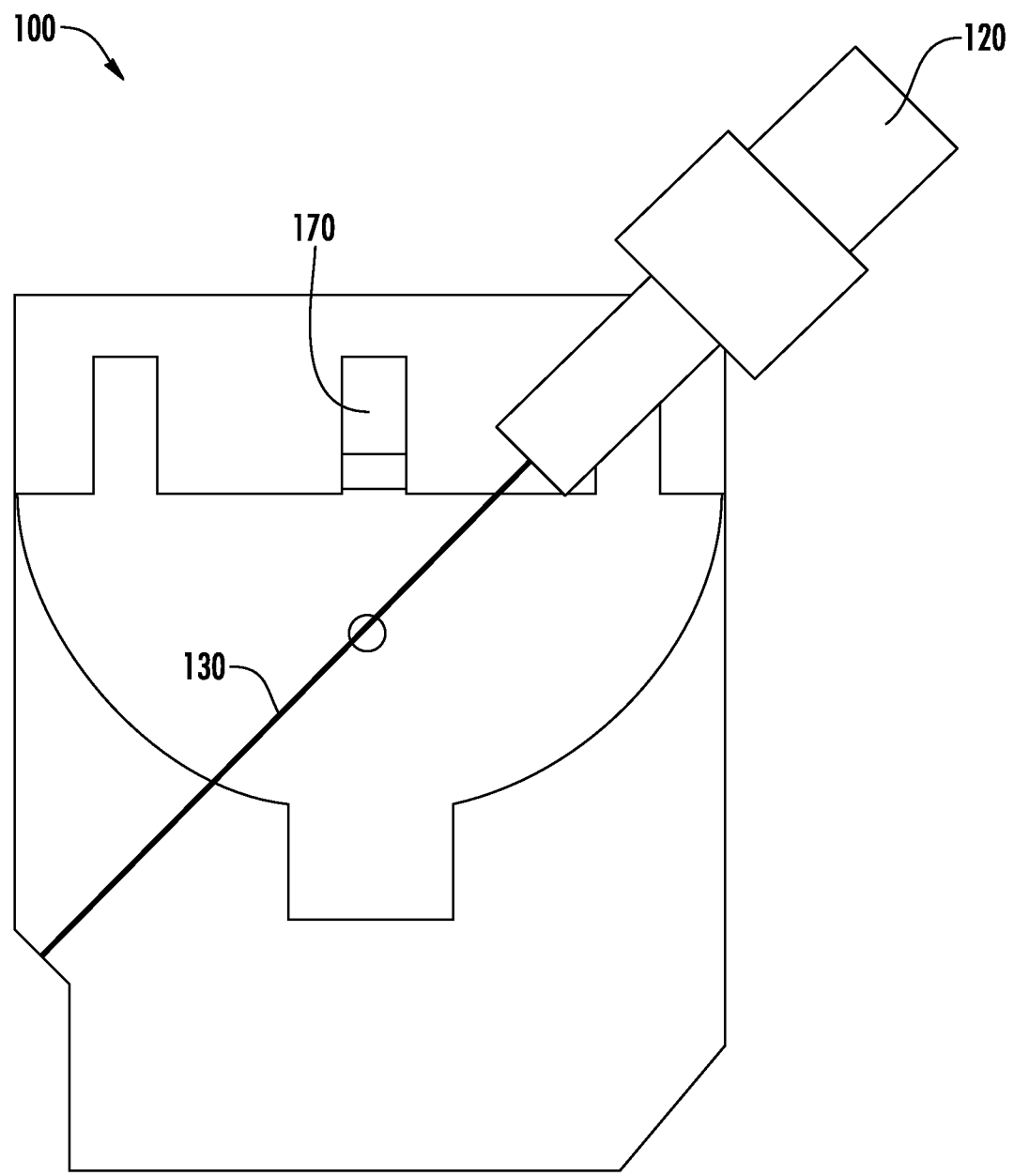
FIG. 2 is a cross-sectional illustration of a secondary particulate detector of FIG. 1, in accordance with an embodiment of the disclosure.
Figure 3:
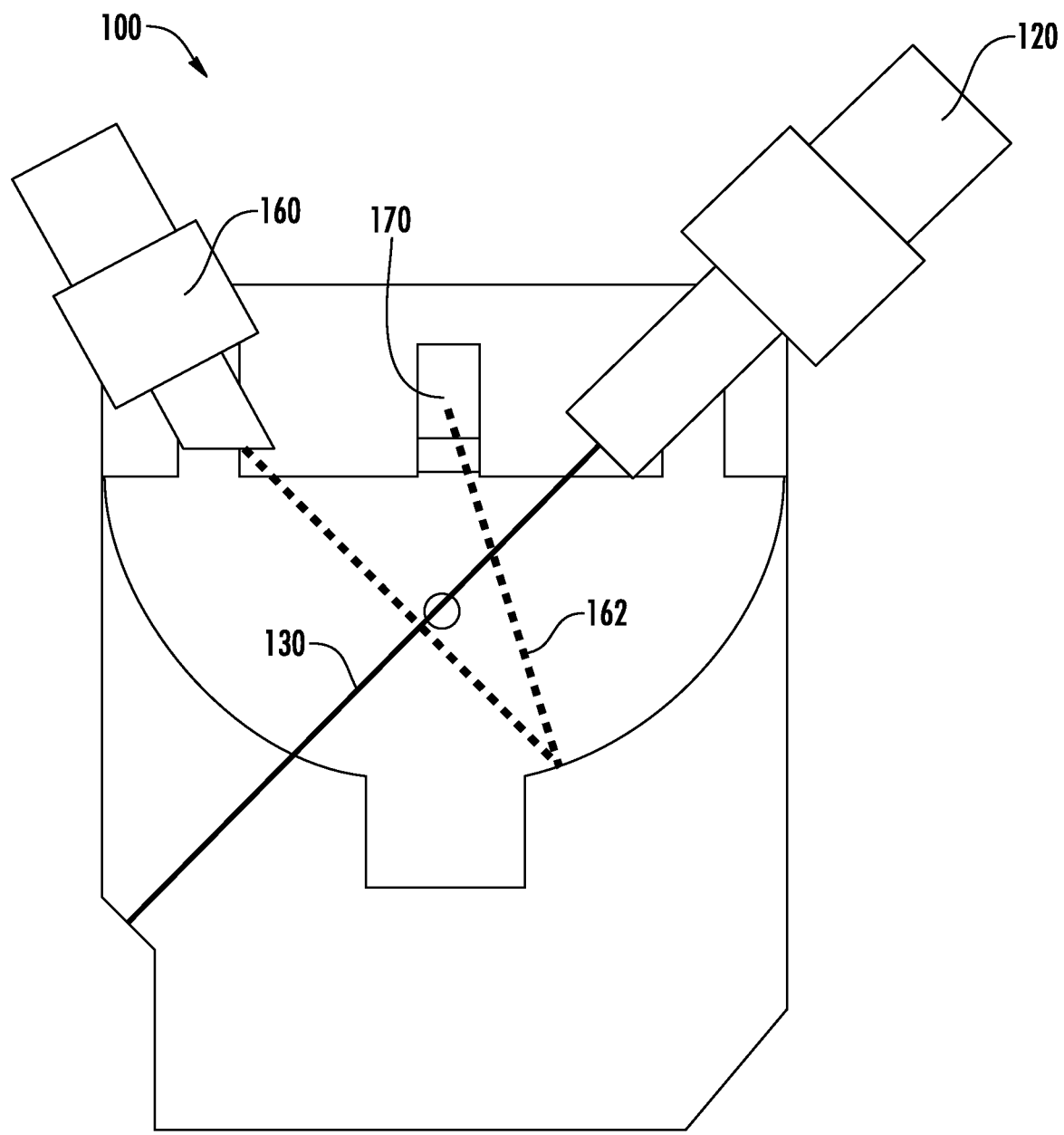
FIG. 3 is a cross-sectional illustration of a secondary particulate detector of FIG. 1, in accordance with an embodiment of the disclosure.

Referring now to FIGS. 2 and 3 with continued reference to FIG. 1. FIGS. 2 and 3 each show a cross-section illustration of the secondary particulate detector 100. The secondary particulate detector 100 may include a laser source 120 configured to generate a laser 130 having a plurality of wavelengths and polarizations. The secondary particulate detector 100 may also include a sensor 170 configured to detect at least one of an amount of laser scatter, laser fluorescence or light generated from nonlinear optical effects in response to interaction of the laser 130 and air particulates. The secondary particulate detector 100 is configured to transmit at least one of the amount of light scatter and the laser fluorescence to the aspiration particulate detection system 50. The secondary particulate detector 100 may also be configured to determine an identity 210 of the air particulate in response to at least one of the amount of light scatter and the laser fluorescence. For example, light scatter and/or laser fluorescence may help identify smoke and combustion materials. Once the identity 210 of the air particulate is determined, the secondary particulate detector 100 is configured to transmit the identity 210 of the air particulate to the aspiration particulate detection system 50. The aspiration particulate detection system 50 is configured to activate an alarm in response to the identity 210 of the air particulate. The alarm may be audible and/or visual.

As seen in FIG. 3, the secondary particulate detector 100 may also include a light source 160 configured to generate an ultraviolet light and/or an infrared light. The infrared light can be one or more wavelengths in a range of 700 nm to 30,000 nm, 700 nm 4,000 nm or more specifically, 700 nm 1,500 nm. The ultraviolet light can be in a wavelength range of 25 nm to 480 nm, 160 nm to 480 nm or more specifically 375 nm to 480 nm. In addition, a detector 170 configured to detect an ultraviolet or infrared signature of an air particulate in response to interaction of the infrared light 162 and the air particulate. The secondary particulate detector 100 is configured to reflect light from the light source 160 to the detector 170. A single reflection, as shown in FIG. 3, increases the path length and improves sensitivity to the air particulates of interest. Multiple passes can be utilized to increase the path length further to improve sensitivity to gases. Ultraviolet light may be utilized to identify biomolecules, spores, cells and toxins by looking for laser induced fluorescence. Infrared may be utilized to detect combustion, industrial and toxic particulates that have vibrational resonances in the infrared frequency band. The resonance cause light to be absorbed reducing the transmitted light and changing the signal that the detector 170 observes. The secondary particulate detector 100 is configured to transmit the infrared signature to the aspiration particulate detection system 50. The secondary particulate detector 100 may also be configured to determine an identity 210 of the air particulate in response to the ultraviolet or infrared signature.

A location 220, a concentration 230, and/or an identity 210 of the air particulate may be determined by algorithms that process the data collected from sensor 170 in the secondary particulate detector 100. The location 220 may depict the detection area 12 where the air particulate was detected and/or where in the detection area 12 the air particulate was detected. The air particulate concentration 230 may depict a concentration of the air particulate in the location 220 and/or detection area 12. The air particulate concentration 230 may be a particulate concentration at a size. In order to determine the location 220, the concentration 230, and/or the identity 210 of the air particulate, data collected by the secondary particulate detector 100 may be compared to a histogram of values. The presence of a statistically significant value may initiate an alarm. The addition of multiple data points collected over time and from different configurations is used to identify the air particulates. A parallel decision making approach based on support vector machine learning process compares the multiple data points to a multidimensional threshold. The result from the threshold is determination of the air particulates' identity 210. The secondary particulate detector 100 can be configured to transmit the location 220, concentration 230, and/or identity 210 of the air particulate to the aspiration particulate detection system 50 and/or a user device 300. An air particulate concentration 230 of the air particulate is then displayed on a user interface of a user device, an alarm panel and/or a remote visualization tool. A user device may include but is not limited to a computing device, such as, for example a desktop computer, a smart phone, a smart watch, a tablet, and/or any similar computing device known to one of skill in the art.

The use device 300 is in electronic communication with at least one of the secondary particulate detector 100 and the aspiration particulate detection system 50. The user device 300 may include a touch screen (not shown), mouse, keyboard, scroll wheel, physical button, or any input mechanism known to one of skill in the art. The user device 300 may include a processor 350, memory 352 and communication module 354 as shown in FIG. 1. The processor 350 can be any type or combination of computer processors, such as a microprocessor, microcontroller, digital signal processor, application specific integrated circuit, programmable logic device, and/or field programmable gate array. The memory 352 is an example of a non-transitory computer readable storage medium tangibly embodied in the user device 300 including executable instructions stored therein, for instance, as firmware. The communication module 354 may implement one or more communication protocols as described in further detail herein. Embodiments herein generate a graphical user interface on the user device 300 through an application 355. The graphical user interface may display at least one of the air particulate concentration 230, the location 220 of the air particulate, and the identity 210 of the air particulate. The aspiration particulate detection system 50 may be configured to activate an alarm 359 in response to the identity 210 of the air particulate. The alarm 359 may be audible and/or visual. The alarm 359 may emanate from the user device 300. The user device 300 may include an alert device 357 configured to activate the alarm 359. In three non-limiting examples, the alert device 357 may be a vibration motor, audio speaker, and/or display screen.

Figure 4:
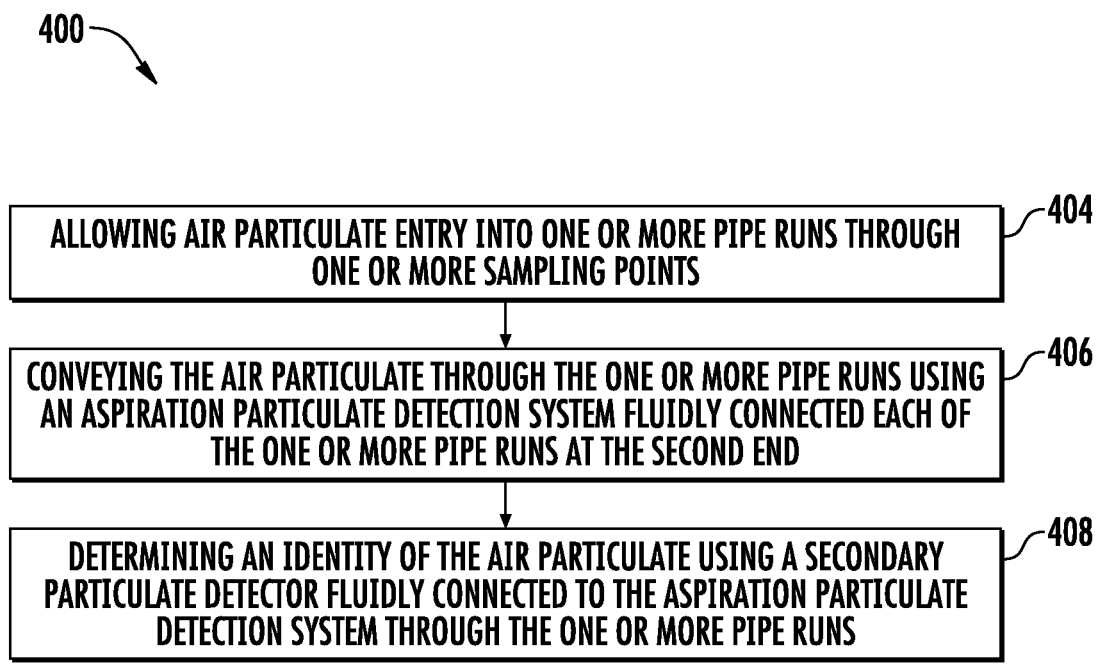
FIG. 4 is a flow diagram illustrating a method of detecting air particulates, according to an embodiment of the present disclosure.

Referring now also to FIG. 4 with continued reference to FIGS. 1-3. FIG. 4 shows a flow diagram illustrating a method 400 of detecting air particulates. At block 404, an air particulate is allowed entry into one or more pipe runs 70 through one or more sampling points 60. Each of the one or more pipe runs 70 initiates at a first end 72 and terminates at a second end 74. At block 406, the air particulate is conveyed through the one or more pipe runs 70 using an aspiration particulate detection system 50 fluidly connected each of the one or more pipe runs 70 at the second end 74. As mentioned above, a blower 52 may be used to convey the air particulate. At block 408, an identity 210 of the air particulate is determined using a secondary particulate detector 100 fluidly connected to the aspiration particulate detection system 50 through the one or more pipe runs 70. The method 400 may also include transmitting the identity 210 of the air particulate from the secondary particulate detector 100 to the aspiration particulate detection system 50. The method 400 may further include: determining at least one of a location 220 of the air particulate and an air particulate concentration 230. The method 400 may also include: displaying at least one of the air particulate concentration 230, the location 220 of the air particulate, and the identity 210 of the air particulate. The air particulate concentration 230, the location 220 of the air particulate, and/or the identity 2140 of the air particulate may be displayed on a user device, as described above. The method 400 may further include: activating an alarm 359 in response to at least one of the air particulate concentration 230, the location 220 of the air particulate, and the identity 210 of the air particulate. The alarm 359 may be audible and/or visual, as described above. The alarm 359 may emanate from the user device 300.

While the above description has described the flow process of FIG. 4 in a particular order, it should be appreciated that unless otherwise specifically required in the attached claims that the ordering of the steps may be varied.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes a device for practicing the embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An air particulate detection system comprising:
an aspiration particulate detection system;
one or more pipe runs fluidly connected to the aspiration detection system,
wherein each of the one or more pipe runs includes one or more sampling points configured to allow an air particulate entry into at least one of the one or more pipe runs; and
a secondary particulate detector fluidly connected to the aspiration particulate detection system through the one or more pipe runs, wherein the secondary particulate detector is in communication with the aspiration particulate detection system,
wherein the secondary particulate detector further comprises:
a laser source configured to generate a laser having a plurality of wavelengths; and
a sensor configured to detect at least one of an amount of laser scatter and laser fluorescence in response to interaction of the laser and air particulates.

2. The air particulate detection system of claim 1, wherein:
the aspiration particulate detection system further comprises a blower to transport the air particulate from each of the one or more sampling points through the one or more pipe runs to the aspiration particulate detection system.

3. The air particulate detection system of claim 2, wherein:
the air is transported through the secondary particulate detector by the blower.

4. The air particulate detection system of claim 1, wherein:
the secondary particulate detector is configured to transmit at least one of the amount of light scatter and the laser fluorescence to the aspiration particulate detection system.

5. The air particulate detection system of claim 1, wherein:
the secondary particulate detector is configured to determine an identity of the air particulate in response to at least one of the amount of light scatter and the laser fluorescence.

6. The air particulate detection system of claim 5, wherein:
the secondary particulate detector is configured to transmit the identity of the air particulate to the aspiration particulate detection system.

7. The air particulate detection system of claim 6, wherein:
the aspiration particulate detection system is configured to activate an alarm in response to the identity of the air particulate.

8. The air particulate detection system of claim 1, wherein:
the secondary particulate detector further comprises:
an infrared light source configured to generate an infrared light; and
a sensor configured to detect an infrared signature of an air particulate in response to interaction of the infrared light and the air particulate.

9. The air particulate detection system of claim 8, wherein:
the secondary particulate detector is configured to transmit the infrared signature to the aspiration particulate detection system.

10. The air particulate detection system of claim 8, wherein:
the secondary particulate detector is configured to determine an identity of the air particulate in response to the infrared signature.

11. The air particulate detection system of claim 10, wherein:
the secondary particulate detector is configured to transmit the identity of the air particulate to the aspiration particulate detection system.

12. The air particulate detection system of claim 11, wherein:
the aspiration particulate detection system is configured to activate an alarm in response to the identity of the air particulate.

13. The air particulate detection system of claim 1, wherein:
the secondary particulate detector is located in a first detection area and the aspiration particulate detection system is located in a second detection area separate from the first detection area.

14. The air particulate detection system of claim 1, wherein:
the secondary particulate detector is located proximate at least one of the one or more sampling points.

15. A method of detecting air particulates, the method comprising:
allowing air particulate entry into one or more pipe runs through one or more sampling points, wherein each of the one or more pipe runs initiate at a first end and terminate at a second end;
conveying the air particulate through the one or more pipe runs using an aspiration particulate detection system fluidly connected each of the one or more pipe runs at the second end; and
determining an identity of the air particulate using a secondary particulate detector fluidly connected to the aspiration particulate detection system through the one or more pipe runs,
wherein the secondary particulate detector further comprises:
a laser source configured to generate a laser having a plurality of wavelengths, and
a sensor configured to detect at least one of an amount of laser scatter and laser fluorescence in response to interaction of the laser and air particulates.

16. The method of claim 15, further comprising:
transmitting the identity of the air particulate from the secondary particulate detector to the aspiration particulate detection system.

17. The method of claim 15, further comprising:
determining at least one of a location of the air particulate and an air particulate concentration.

18. The method of claim 17, further comprising:
displaying at least one of the air particulate concentration, the location of the air particulate, and the identity of the air particulate.

19. The method of claim 15, further comprising:
activating an alarm in response to at least one of the air particulate concentration, the location of the air particulate, and the identity of the air particulate.

20. An air particulate detection system comprising:
an aspiration particulate detection system;
one or more pipe runs fluidly connected to the aspiration detection system, wherein each of the one or more pipe runs includes one or more sampling points configured to allow an air particulate entry into at least one of the one or more pipe runs; and
a secondary particulate detector fluidly connected to the aspiration particulate detection system through the one or more pipe runs, wherein the secondary particulate detector is in communication with the aspiration particulate detection system,
wherein the secondary particulate detector further comprises:
an infrared light source configured to generate an infrared light; and
a sensor configured to detect an infrared signature of an air particulate.

* * * * *